United States Patent
Kolbe et al.

(10) Patent No.: US 11,006,339 B2
(45) Date of Patent: May 11, 2021

(54) HANDLING AT LEAST ONE COMMUNICATION EXCHANGE BETWEEN A TELECOMMUNICATIONS NETWORK AND AT LEAST ONE USER EQUIPMENT

(71) Applicant: Deutsche Telekom AG, Bonn (DE)

(72) Inventors: Hans-Joerg Kolbe, Darmstadt (DE); Dieter Busch, Ober-Ramstadt (DE)

(73) Assignee: DEUTSCHE TELEKOM AG, Bonn (DE)

( * ) Notice: Subject to any disclaimer, the term of this patent is extended or adjusted under 35 U.S.C. 154(b) by 226 days.

(21) Appl. No.: 15/762,562

(22) PCT Filed: Jul. 15, 2016

(86) PCT No.: PCT/EP2016/066956
§ 371 (c)(1),
(2) Date: Mar. 23, 2018

(87) PCT Pub. No.: WO2017/050456
PCT Pub. Date: Mar. 30, 2017

(65) Prior Publication Data
US 2018/0302479 A1    Oct. 18, 2018

(30) Foreign Application Priority Data
Sep. 25, 2015    (EP) .................................... 15186910

(51) Int. Cl.
*H04L 29/08* (2006.01)
*H04L 12/66* (2006.01)
(Continued)

(52) U.S. Cl.
CPC ............. *H04W 36/12* (2013.01); *H04L 12/66* (2013.01); *H04L 67/00* (2013.01);
(Continued)

(58) Field of Classification Search
CPC .. H04L 67/148; H04L 45/74; H04W 28/0226; H04W 28/08
(Continued)

(56) References Cited

U.S. PATENT DOCUMENTS

| | | |
|---|---|---|
| 5,812,819 A | 9/1998 | Rodwin et al. |
| 6,370,380 B1 * | 4/2002 | Norefors ............... H04L 63/126 455/436 |

(Continued)

FOREIGN PATENT DOCUMENTS

| | | |
|---|---|---|
| CN | 101161028 A | 4/2008 |
| CN | 104811375 A | 7/2015 |

(Continued)

OTHER PUBLICATIONS

Droms et al. "Dynamic Host Configuration Protocol for IPv6 (DHCPv6); rfc3315.txt", https://tools.ietf.org/html/rfc3315#section-15.12 (Year: 2003).*

(Continued)

*Primary Examiner* — James E Springer
*Assistant Examiner* — Patrick F Ngankam
(74) *Attorney, Agent, or Firm* — Leydig, Voit & Mayer, Ltd.

(57) ABSTRACT

A method for improved handling of at least one communication exchange between a telecommunications network and at least one user equipment includes: in a first step, the at least one communication exchange is enabled by performing an attachment procedure of the at least one user equipment to the telecommunications network involving a first gateway entity; and in a second step, subsequent to the first step, the at least one user equipment transmits at least one subsequent data packet, the at least one subsequent data packet being received by a second gateway entity instead of the first gateway entity.

13 Claims, 2 Drawing Sheets

(51) Int. Cl.

| | |
|---|---|
| *H04W 36/12* | (2009.01) |
| *H04L 29/14* | (2006.01) |
| *H04W 36/00* | (2009.01) |
| *H04W 28/08* | (2009.01) |
| *H04L 29/12* | (2006.01) |
| *H04W 60/00* | (2009.01) |
| *H04L 12/741* | (2013.01) |
| *H04W 28/02* | (2009.01) |
| *H04L 29/06* | (2006.01) |

(52) U.S. Cl.
CPC ...... *H04L 67/1002* (2013.01); *H04L 67/1031* (2013.01); *H04L 67/141* (2013.01); *H04L 67/142* (2013.01); *H04L 67/146* (2013.01); *H04L 67/148* (2013.01); *H04L 67/28* (2013.01); *H04L 67/2814* (2013.01); *H04L 69/40* (2013.01); *H04L 45/74* (2013.01); *H04L 61/2007* (2013.01); *H04L 63/0807* (2013.01); *H04L 63/126* (2013.01); *H04W 28/0226* (2013.01); *H04W 28/08* (2013.01); *H04W 36/0038* (2013.01); *H04W 60/00* (2013.01)

(58) Field of Classification Search
USPC .......................................................... 709/228
See application file for complete search history.

(56) References Cited

U.S. PATENT DOCUMENTS

| | | | |
|---|---|---|---|
| 2004/0066764 A1* | 4/2004 | Koodli | .................... H04L 47/15 370/331 |
| 2006/0203776 A1 | 9/2006 | Berghoff et al. | |
| 2010/0085920 A1* | 4/2010 | Chari | .................. H04L 12/2856 370/328 |
| 2014/0269499 A1 | 9/2014 | Pang et al. | |
| 2014/0310418 A1 | 10/2014 | Sorenson, III | |

FOREIGN PATENT DOCUMENTS

| | | | |
|---|---|---|---|
| EP | 0830773 A1 | 3/1998 | |
| EP | 1408666 A1 * | 4/2004 | ............ H04W 40/02 |
| EP | 1408666 A1 | 4/2004 | |
| JP | 2004328563 A | 11/2004 | |

OTHER PUBLICATIONS

Droms R et al: "Dynamic Host Configuration Protocol for IPv6 (DHCPv6); rfc3315.txt", 5. JCT-VC Meeting; 96. MPEG Meeting; Mar. 16, 2011-Mar. 23, 2011; Geneva; (Joint Collaborative Team on Video Coding of ISO/IEC JTC1/SC29/WG11 and ITU-T SG.16); Jul. 1, 2003 (Jul. 1, 2003), XP015009185, pp. 1-102.

Gundavelli S et al: "Proxy Mobile IPv6; rfc5213.txt", Proxy Mobile IPV6; RFC5213.TXT, Internet Engineering Task Force, IETF; Standard, Internet Society (ISOC), Aug. 1, 2008 (Aug. 1, 2008), XP015060252, pp. 1-92.

DEC Cisco Systems T Mrugalski ISC T Sun China Mobile B Sarikaya Huawei USA a Matsumoto NTT NT LAB W: "DHCpv6 Route Options; draft-ietf-mif-dhcpv6-route-option-05.txt", DHCPV6 Route Options; Draft-IETF-MIF-DHCPV6-Route-Option-05.TXT, Internet Engineering Task Force, IETF; Standardworkingdraft, Internet Society (ISOC), Aug. 24, 2012 (Aug. 24, 2012), pp. 1-22, XP015086970.

* cited by examiner

HANDLING AT LEAST ONE COMMUNICATION EXCHANGE BETWEEN A TELECOMMUNICATIONS NETWORK AND AT LEAST ONE USER EQUIPMENT

CROSS-REFERENCE TO RELATED APPLICATIONS

This application is a U.S. National Phase application under 35 U.S.C. § 371 of International Application No. PCT/EP2016/066956, filed on Jul. 15, 2016, and claims benefit to European Patent Application No. EP 15186910.4, filed on Sep. 25, 2015. The International Application was published in English on Mar. 30, 2017 as WO 2017/050456 A1 under PCT Article 21(2).

FIELD

The present invention relates a method for improved handling of at least one communication exchange between a telecommunications network and at least one user equipment, the communication exchange being based on the transmission and reception of data packets between the telecommunications network and the at least one user equipment, wherein the telecommunications network comprises a plurality of gateway entities.

Furthermore, the present invention relates to a telecommunications network for improved handling of at least one communication exchange between the telecommunications network and at least one user equipment, the communication exchange being based on the transmission and reception of data packets between the telecommunications network and the at least one user equipment, wherein the telecommunications network comprises a plurality of gateway entities.

Additionally, the present invention relates to a user equipment and a system for improved handling of at least one communication exchange between a telecommunications network and at least one user equipment, the system comprising the telecommunications network and the user equipment, the communication exchange being based on the transmission and reception of data packets between the telecommunications network and the at least one user equipment, wherein the telecommunications network comprises a plurality of gateway entities.

Furthermore, the present invention relates to a program and a computer program product.

BACKGROUND

The exchange of packetized information in broadband communication systems or telecommunications networks, both in fixed-line as in wireless communication systems (or fixed-line communication networks and mobile communication networks) has already grown dramatically and probably will also grow in the future due to the rapid spread of different data services in such communication networks.

Broadband networks make extensive use of subscriber sessions that are set up and maintained between a client, typically a user equipment, and a gateway device (or gateway entity). A session is usually implemented as a tunnel carrying data packets, typically IP (Internet Protocol) data packets (or IP packets), and making use of in-band control plane activity like session setup and periodic keep-alive messages. In fixed line networks, usual deployments make use, e.g., of the PPPoE protocol (Point-to-Point Protocol over Ethernet, RFC 2516) between the user equipment (typically the home gateway in this case) and the gateway which is typically the BRAS (Broadband Remote Access Server) or BNG (Broadband Network Gateway). Alternatively to the use of PPPoE, DHCP (Dynamic Host Configuration Protocol, RFC2361) may be used. In case IPv6 (Internet Protocol Version 6) is present, DHCPv6 (RFC 3315 et al.) or SLAAC (Stateless Address Autoconfiguration (SLAAC), RFC 4862 et al.) and IPoE (Internet Protcol over Ethernet) are common too.

Most presently used technologies have to ensure a "split horizon" with a dedicated endpoint for IP-routing in the telecommunications network, typically the infrastructure of a network provider. Thereby, it is ensured that any-to-any connectivity on the IP layer (Internet Protocol layer) is only available northbound (i.e. upstream) of this endpoint for IP-routing, and that user traffic is separated in the access network in the sense that data packets related to a specific session tunnel are separated from data packets related to other session tunnels. The separation is dependent on the used access network technology.

Likewise for access technologies in mobile communication networks, i.e. for mobile access, the protocols and tunnels are similar but as an additional feature, a mobility function is added (compared to fixed-line telecommunications network). Tunnels are being handed over in case a device (or user equipment) moves from one location to another. Such handovers may imply a change of the gateway (or gateway entity) handling the respective session (i.e. the respective data transmission tunnel) or not. In case such a change of the gateway entity is required, a number of different handover steps (also called handover states) are typically used, e.g., a handover preparation phase, a handover execution phase and a handover completion phase. For example, in the handover preparation phase (of a X2 handover), typically the source gateway entity (or source base station entity such as an Evolved Node B (eNodeB) in a mobile communication network) decides to handover the user equipment to the target gateway entity (or target base station entity), which, inter alia, involves creating a tunnel for downlink data packets between the source and target base station entities, performing a transfer of the downlink and uplink data packet status to the target base station entity, etc. Protocols usually used in mobile communication networks are GTP (GPRS (General Packet Radio System) Tunneling Protocol) and Proxy Mobile IP. Proxy Mobile IPv6 is specially used in handover scenarios in multi RAN (Radio Access Network) deployments.

In essence, this means that via using sessions (comprising tunnels) the telecommunications network able to provide (1) network attachment/detachment to provide layer 3 (or Internet Protocol) access, (2) anchoring for user equipment mobility, (3) keepalives (OAM, Operations, administration and management), (4) session re-establishment in case of failure, (5) interaction with backend systems during session setup to provide service profiles/information, and (6) identification of subscribers using the tunnel identifiers.

Hence, such tunneling technologies are widely used in telecommunications networks, and rather complex architectures have been designed and standardized building upon this principle such as the 3GPP Evolved Packet Core (EPC).

However, all these approaches lead to a single point of failure (i.e. lack a viable redundancy scheme), as sessions are being pinned to a gateway (or gateway entity) acting as IP anchor point. As these gateways are usually implemented as expensive hardware-based routers that are comparatively slow in writing and copying state information, it is difficult and/or costly to provide redundancy for such gateways (or gateway entities). The support of mobility requires a huge amount of signaling for tunneling the layer 3 packet in between the user equipment and the IP-anchor point.

In case a device moves and needs to be connected to a different gateway, an extremely complex handover procedure is executed to move the subscriber session tunnel from the source to the target gateway (or gateway entity).

SUMMARY

In an exemplary embodiment, the present invention provides a method for improved handling of at least one communication exchange between a telecommunications network and at least one user equipment. The at least one communication exchange is based on the transmission and reception of data packets between the telecommunications network and the at least one user equipment. The telecommunications network comprises a plurality of gateway entities, the plurality of gateway entities comprising at least a first gateway entity and a second gateway entity. The method includes: in a first step, the at least one communication exchange is enabled by performing an attachment procedure of the at least one user equipment to the telecommunications network involving the first gateway entity, wherein during the attachment procedure, initial data packets are transmitted, wherein token information is generated by the telecommunications network, and wherein the token information is transmitted from the telecommunications network to the at least one user equipment, the token information being indicative of the at least one communication exchange of the at least one user equipment to be established with the telecommunications network; and in a second step, subsequent to the first step, the at least one user equipment transmits at least one subsequent data packet, the at least one subsequent data packet being received by the second gateway entity instead of the first gateway entity, wherein the at least one subsequent data packet comprises the token information or modified token information such that the token information is derivable from the modified token information of the at least one subsequent data packet, wherein—based on the token information or the modified token information received from the at least one user equipment—the second gateway entity generates a packet processing rule information via which handling, enabling the continuation of the at least one communication exchange, of the at least one subsequent data packet is provided.

BRIEF DESCRIPTION OF THE DRAWINGS

The present invention will be described in even greater detail below based on the exemplary figures. The invention is not limited to the exemplary embodiments. All features described and/or illustrated herein can be used alone or combined in different combinations in embodiments of the invention. The features and advantages of various embodiments of the present invention will become apparent by reading the following detailed description with reference to the attached drawings which illustrate the following.

DETAILED DESCRIPTION

Figure 1:
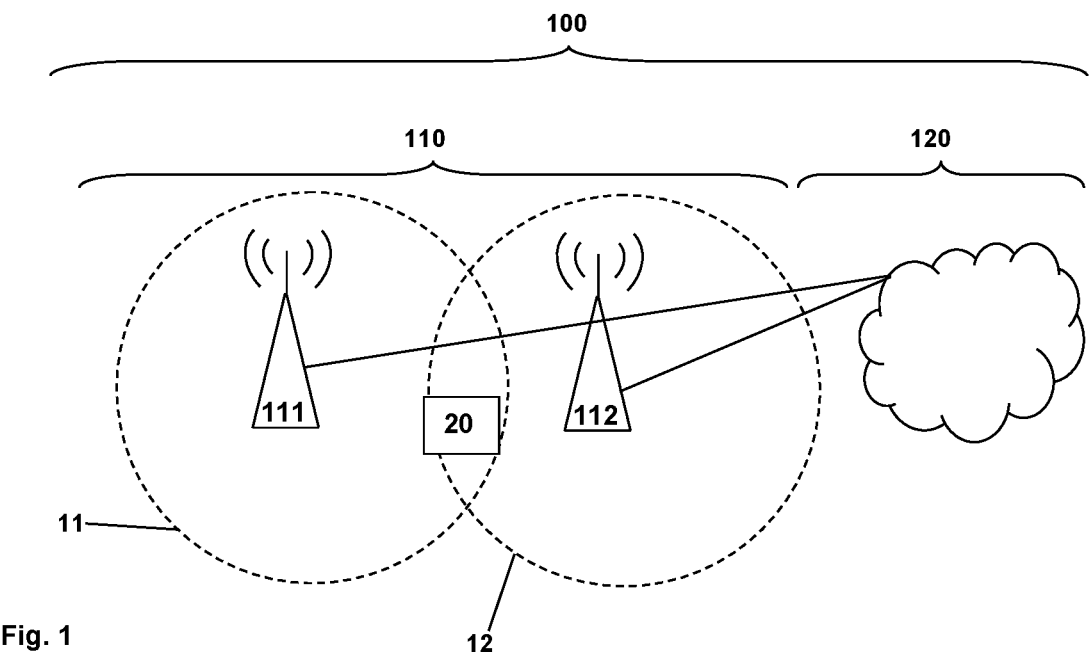
FIG. 1 schematically illustrates a mobile communication network as an example of an exemplary embodiment of an inventive telecommunications network with a first base station entity as a first gateway entity, and a second base station entity as a second gateway entity, a user equipment, a core network, and an access network.

Exemplary embodiments of the present invention provide a technically simple, effective and cost effective solution for improved handling of at least one communication exchange between a telecommunications network and at least one user equipment. Exemplary embodiments of the present invention further provide a corresponding telecommunications network, a corresponding user equipment, and a corresponding system comprising a telecommunications network and at least one user equipment.

In an exemplary embodiment, the present invention provides a method for improved handling of at least one communication exchange between a telecommunications network and at least one user equipment, the communication exchange being based on the transmission and reception of data packets between the telecommunications network and the at least one user equipment, wherein the telecommunications network comprises a plurality of gateway entities, the plurality of gateway entities comprising at least a first gateway entity and a second gateway entity, wherein the method comprises the following steps:

in a first step, the communication exchange is enabled by performing an attachment procedure of the user equipment to the telecommunications network involving the first gateway entity, wherein during the attachment procedure, initial data packets are transmitted, wherein token information is generated by the telecommunications network, and wherein the token information is transmitted from the telecommunications network to the user equipment, the token information being indicative of the communication exchange of the user equipment to be established with the telecommunications network, in a second step, subsequent to the first step, the user equipment transmits at least one subsequent data packet, the at least one subsequent data packet being received by the second gateway entity instead of the first gateway entity, wherein the at least one subsequent data packet comprises the token information or modified token information such that the token information is derivable from the modified token information of the at least one subsequent data packet, wherein—based on the token information or modified token information received from the user equipment—the second gateway entity generates a packet processing rule information via which handling, enabling the continuation of the communication exchange, of the at least one subsequent data packet is provided.

It is thereby advantageously possible according to the present invention that a real (or at least a nearly) stateless network core or gateway system can be realized.

By making use of stateless technology and applying it to fixed and mobile broadband access, i.e. fixed-line telecommunications networks or mobile communication networks, it is advantageously possible to truly avoid a single point of failure, to comparatively easily provide redundancy, especially of the gateway entities within the telecommunications network, and—especially in case of the telecommunications network being a mobile communication network—likewise to provide a mobility and handover functionality in a comparatively easy manner.

Other conventional approaches, e.g. based on Network Functions Virtualization, talk about "lean mobility management" or "lean core". In essence, these proposed solutions have in common that the session state (of any user equipment) is replicated into central server entities. In case a gateway instance fails, it is easy to write the state to another instance, e.g. inside a data center, and re-route the traffic. In other deployments, the state (of a session, i.e. between a user equipment and a gateway entity) is shared on-the-fly amongst multiple gateway instances. In both cases, in case of a failover, the traffic needs to be re-routed towards the (living) gateways, a procedure that is nowadays in most cases implemented by a configurable/programmable load-balancer entity. This approach solves some of the issues of technologies using complex sessions, such as state transfer and redundancy, but it comes at the expense of another central entity that provides the state and handover management as a single point of failure and does not really leverage the cloud paradigm.

According to the present invention, the use of a complex session (involving a correspondingly complex session context) is avoided and nevertheless it is avoided to define single point of failure at another level or point in the telecommunications network.

Especially according to the present invention, there is no need for a central state management system and load sharing, and recovery of network state can be implemented completely without the involvement of a centralized state server. According to the present invention it is thereby advantageously possible to greatly improve management and operations as well as cost and time-to-service for new network elements of the telecommunications network.

According to the present invention, improved handling of at least one communication exchange between a telecommunications network and at least one user equipment can be achieved via using tokens or token information being initially generated by the telecommunications network and being at least periodically or upon request re-transmitted, by the user equipment, to the telecommunications network.

The telecommunications network according to the present invention might be a fixed-line telecommunications network or a mobile communication network. However, it is not excluded according to the present invention to implement the use of an exchange of token information in a telecommunications network having both aspects (or parts) of a fixed-line telecommunications network (or being a fixed-line telecommunications network in such parts) and aspects (or parts) of a mobile communication network (or being a mobile communication network in such parts); such networks are also known under the term fixed-mobile-convergence networks (FMC networks).

Exemplary embodiments of the invention realize, via exemplary embodiments of the inventive method and the inventive telecommunications network or user equipment or system, an enhanced communication service towards a plurality of user equipments connected to or otherwise related to the telecommunications network.

According to the present invention, the communication exchange between, on the one hand, the telecommunications network, and, on the other hand, the user equipment (but preferably the plurality of user equipments) is based on the transmission and reception of data packets between the telecommunications network and the at least one user equipment. The direction of a data packet being transmitted by the telecommunications network and received by the respective user equipment (or the at least one user equipment) is called downlink or downstream direction, whereas the direction of a data packet being transmitted by the respective user equipment towards the telecommunications network is called uplink or upstream direction.

In order to handle the traffic from and to the at least one user equipment (but typically a multitude of user equipments), the telecommunications network comprises a plurality of gateway entities. In the context of the present invention, especially a first gateway entity and a second gateway entity are explicitly mentioned. In a first step, an exemplary embodiment of the inventive method of the present invention involves establishing the communication exchange (between the telecommunications network and one of the user equipments). This is enabled by performing an attachment procedure of the user equipment to the telecommunications network involving the first gateway entity. During the attachment procedure, initial data packets (i.e. the data packets required to be exchanged for performing the attachment procedure) are transmitted. Additionally, token information is generated by the telecommunications network, and the token information is transmitted from the telecommunications network to the user equipment, namely as part of the initial data packets. According to the present invention, the token information is indicative of the communication exchange of the user equipment to be established with the telecommunications network.

In a second step, subsequent to the first step, the user equipment transmits at least one subsequent data packet (i.e. a data packet sent after the attachment procedure is completed—according to the assumption made, the attachment procedure involves a communication between the user equipment and the first gateway entity), and the at least one subsequent data packet is received—for whatever reason— by the second gateway entity instead of the first gateway entity. Typical reasons for the subsequent data packet being received by the second gateway entity instead of the first gateway entity include (but are not limited to) a failure condition and/or an overload condition of the first gateway entity or of the transmission channel towards the first gateway entity and/or a movement of the user equipment relative to the first gateway entity.

According to the present invention, the at least one subsequent data packet comprises the token information or modified token information such that the token information is derivable from the modified token information of the at least one subsequent data packet. Based on the token information or modified token information received from the user equipment, the second gateway entity is enabled to generate a packet processing rule information via which handling, enabling the continuation of the communication exchange, of the at least one subsequent data packet is provided. The second gateway entity is preferably able to derive, from the token information or from the modified token information received from the user equipment (in order to generated the packet processing rule information), at least IP address information, used by the user equipment for the communication exchange, or a hashed value of IP address information and/or (device) identifier information of the user equipment and/or identifier information of the user of the user equipment and/or of the destination of the at least one subsequent data packet.

Hence according to the present invention—and during the attachment (or prior to completion thereof) of any user equipment to the telecommunications network—the token information is generated by the telecommunications network and transmitted (specifically) to the respective user equipment. In a subsequent point in time, i.e. at the time of transmitting a data packet in the context of the communication exchange between the user equipment and the telecommunications network, the token information or modified token information is transmitted to the telecommunications network. Such a data packet, being transmitted by the user equipment subsequently to the user equipment being attached to the telecommunications network, is called at least one subsequent data packet. The subsequent point in time does not need to necessarily be shortly after completion of the attachment procedure, and likewise, the at least one subsequent data packet does not need to necessarily be transmitted shortly after completion of the attachment procedure, but it could be transmitted shortly after completion of the attachment procedure. According to the present invention, the user equipment is attached to the telecommunications network involving the first gateway entity. The communication exchange might continue after attachment for a longer or shorter time interval involving the first gateway entity (only). However, in case that the communication exchange cannot be continued involving the first gateway entity (for whatever reason), the second gateway entity needs to be involved. In such a situation, i.e. regarding at least one subsequent data packet (which does not necessarily be the first data packet sent by the user equipment and received by the second gateway entity) being sent to the second gateway entity, the token information or the modified token information needs to be transmitted by the user equipment.

According to the present invention, different variants of the exchange of the token information (or the modified token information) between the user equipment and the telecommunications network are possible. According to one alternative solution, all subsequent data packets (i.e. after completion of the attachment procedure or even after transmission of the token information to the user equipment) are required to comprise the token information or the modified token information. According to a further alternative solution, not all subsequent data packets need to comprise the token information or the modified token information; however, according to the present invention, at least periodically, or upon request (by the respective gateway entity), the user equipment transmits a subsequent data packet comprising the token information or the modified token information. This is especially relevant in case of a change from the first gateway entity to the second gateway entity: In case of an implementation such that not all subsequent data packets need to comprise the token information (or the modified token information), the second gateway entity might not be able to correctly manage a data packet that does neither comprise the token information nor the modified token information. In such a situation and according to a variant of the present invention, the second gateway entity requests the transmission of a data packet comprising the token information or the modified token information from the user equipment. In the following, such a data packet, comprising neither the token information nor the modified token information, is also called a further subsequent data packet.

Hence, according to a preferred embodiment of the present invention, during a third step, subsequent to the first step but prior to the second step, a further subsequent data packet is received by the second gateway entity (i.e. prior to the at least one subsequent data packet), the further subsequent data packet lacking the token information (i.e. both the token information and the modified token information), wherein—during a fourth step, subsequent to the third step and prior to the second step—the second gateway entity requests, from the user equipment, the transmission of the token information or the modified token information.

As detailed above, it is thereby advantageously possible to implement different variants and different alternatives of exemplary embodiments of the inventive method. Especially, it is thereby possible to not always assure the transmission of the token information or the modified token information as part of each and every data packet sent by the user equipment towards the telecommunications network.

According to a further preferred embodiment of the present invention, the token information and/or the modified token information comprises at least one out of the following information:

IP address information, especially corresponding to the IP address used by the user equipment or signaled by the at least one subsequent data packet, hash value information of IP address information, especially corresponding to the IP address used by the user equipment or signaled by the at least one subsequent data packet, device identification information of the user equipment or identification information of the user of the user equipment, hash value information of device identification information of the user equipment or of identification information of the user of the user equipment, an indication related to one or a plurality of quality-of-service related parameters associated with the communication exchange, especially an allowed and/or usable bandwidth information, an indication related to routing information or related to routing-relevant information, signed part information allowing for a security check to be performed based on the token information or the modified token information, an indication related to one or a plurality of policies to apply by the receiving node of the telecommunications network, an indication related to one or a plurality of user equipment capability related parameters associated with the user equipment and to be applied during the communication exchange, an indication related to one or a plurality of accounting related parameters associated with the communication exchange, an indication related to one or a plurality of network access rights related parameters associated with the communication exchange, an indication related to one or a plurality of content access rights related parameters associated with the communication exchange.

Thereby, it is advantageously possible that that via transmitting the token information (or the modified token information) by the user equipment, the respective data packet can be managed—possibly without relying on performing a multitude of inquiries involving central network nodes and/or performing a comprehensive inquiry involving a central network node—by any gateway entity of the telecommunications network, regardless of whether the user equipment has been attached to the telecommunications network involving this gateway entity or involving another gateway entity. Via providing hash value information of the IP address information, especially corresponding to the IP address used by the user equipment or signaled by the at least one subsequent data packet, and/or hash value information of device identification information of the user equipment or of identification information of the user of the user equipment, it is advantageously possible to verify these pieces of information (i.e. the IP address, the device identification information and/or the identification information of the user of the user equipment) that are also transmitted—via the at least one subsequent data packet and/or via other data packets transmitted in the context of the communication exchange—in parallel to the (hashed) transmission via the token information (or the modified token information).

According to a further preferred embodiment of the present invention, a life time indication is associated with the token information or with the modified token information.

Thereby, it is advantageously possible that the usage of the token information (or of the modified token information) can be limited in time.

Furthermore, according to an embodiment of the present invention, it is preferred that the token information or the modified token information is transmitted, by the user equipment, as part of a header information of the data packet, especially as part of an option in an IPv6 header of IPv6 data packets and/or as part of a network service header (NSH) and/or as part of a VLAN-header (Virtual Local Area Network header) and/or as part of a MAC-Address (Media Access Control address), wherein the transmission of the token information or the modified token information is especially provided within each data packet or only periodically or only upon request from the respective gateway entity.

According to a further preferred embodiment of the present invention, the token information, or the modified token information, is self-contained token information such that the packet processing rule information is generated, by the second gateway entity, solely based on the token information or the modified token information, respectively or the token information, or the modified token information, is abstract token information such that the packet processing rule information is generated, by the second gateway entity, based on the token information or the modified token information, respectively, but using a queries handling network entity of the telecommunications network.

According to the present invention, it is furthermore preferred that the second gateway entity is possibly unaware of the communication exchange and/or the second gateway entity triggers an upstream routing update, the upstream routing update assuring that the return path to the user equipment, via the second gateway entity instead of the first gateway entity, is transmitted to upstream network nodes, especially a load balancer and/or router entity.

Additionally, it is preferred according to the present invention that the decision whether the first gateway entity or the second gateway entity receives the at least one subsequent data packet is dependent on the general availability of the first gateway entity and/or the second gateway entity and/or on a load balancing decision of a load balancing entity within the telecommunications network and/or on the availability of the first and/or second gateway entity for the user equipment related to a different mobility situation of the user equipment.

Furthermore, the present invention relates to a telecommunications network for improved handling of at least one communication exchange between the telecommunications network and at least one user equipment, the communication exchange being based on the transmission and reception of data packets between the telecommunications network and the at least one user equipment, wherein the telecommunications network comprises a plurality of gateway entities, the plurality of gateway entities comprising at least a first gateway entity and a second gateway entity, wherein the telecommunications network is configured such that:

the communication exchange is enabled by performing an attachment procedure of the user equipment to the telecommunications network involving the first gateway entity, wherein during the attachment procedure, initial data packets are transmitted, wherein token information is generated by the telecommunications network, and wherein the token information is transmitted from the telecommunications network to the user equipment, the token information being indicative of the communication exchange of the user equipment to be established with the telecommunications network, the user equipment transmits at least one subsequent data packet, the at least one subsequent data packet being received by the second gateway entity instead of the first gateway entity, wherein the at least one subsequent data packet comprises the token information or modified token information such that the token information is derivable from the modified token information of the at least one subsequent data packet, wherein—based on the token information or modified token information received from the user equipment—the second gateway entity generates a packet processing rule information via which handling, enabling the continuation of the communication exchange, of the at least one subsequent data packet is provided.

According to the present invention—and especially with regard to the telecommunications network but not limited thereto—it is especially preferred that a further subsequent data packet is received by the second gateway entity prior to the at least one subsequent data packet, wherein the further subsequent data packet lacks the token information, wherein the second gateway entity is configured such that, between the further subsequent data packet and the at least one subsequent data packet, the second gateway entity requests the transmission of the token information or modified token information from the user equipment.

According to the present invention—and especially with regard to the telecommunications network but not limited thereto—it is furthermore preferred that the telecommunications network is a fixed line communication network or mobile communication network, wherein the telecommunications network comprises an access network and a core network, and wherein the access network comprises the plurality of gateway entities, wherein the plurality of gateway entities are base station entities of a mobile communication network and/or wherein the plurality of gateway entities are remote access server entities of an aggregation network as part of the access network or the core network of a fixed line communication network and/or wherein the plurality of gateway entities are nodes located either in an access network, aggregation network or core network and/or wherein the plurality of gateway entities are instances residing in a data center where load sharing between these instances is applied based on the token information or an information directly related to the communication exchange such as IP address information.

Furthermore, the present invention relates to a user equipment for improved handling of at least one communication exchange between a telecommunications network and the user equipment, the communication exchange being based on the transmission and reception of data packets between the telecommunications network and the user equipment, wherein the telecommunications network comprises a plurality of gateway entities, the plurality of gateway entities comprising at least a first gateway entity and a second gateway entity, wherein the user equipment is configured such that:

the communication exchange is enabled by performing an attachment procedure of the user equipment to the telecommunications network involving the first gateway entity, wherein during the attachment procedure, initial data packets are transmitted, wherein token information is generated by the telecommunications network, and wherein the token information is transmitted from the telecommunications network to the user equipment, the token information being indicative of the communication exchange of the user equipment to be established with the telecommunications network, the user equipment transmits at least one subsequent data packet, the at least one subsequent data packet being received by the second gateway entity instead of the first gateway entity, wherein the at least one subsequent data packet comprises the token information or modified token information such that the token information is derivable from the modified token information of the at least one subsequent data packet, wherein—based on the token information or modified token information received from the user equipment the second gateway entity generates a packet processing rule information via which handling, enabling the continuation of the communication exchange, of the at least one subsequent data packet is provided.

Additionally, the present invention relates to a system for improved handling of at least one communication exchange between a telecommunications network and at least one user equipment, the system comprising the telecommunications network and the user equipment, the communication exchange being based on the transmission and reception of data packets between the telecommunications network and the at least one user equipment, wherein the telecommunications network comprises a plurality of gateway entities, the plurality of gateway entities comprising at least a first gateway entity and a second gateway entity, wherein the system is configured such that:

the communication exchange is enabled by performing an attachment procedure of the user equipment to the telecommunications network involving the first gateway entity, wherein during the attachment procedure, initial data packets are transmitted, wherein token information is generated by the telecommunications network, and wherein the token information is transmitted from the telecommunications network to the user equipment, the token information being indicative of the communication exchange of the user equipment to be established with the telecommunications network, the user equipment transmits at least one subsequent data packet, the at least one subsequent data packet being received by the second gateway entity instead of the first gateway entity, wherein the at least one subsequent data packet comprises the token information or modified token information such that the token information is derivable from the modified token information of the at least one subsequent data packet, wherein—based on the token information or modified token information received from the user equipment—the second gateway entity generates a packet processing rule information via which handling, enabling the continuation of the communication exchange, of the at least one subsequent data packet is provided.

Still additionally, the present invention relates to a program comprising a computer readable program code which, when executed on a computer and/or on a gateway entity and/or on a user equipment and/or on a network component of a telecommunications network or in part on a gateway entity and/or in part on a user equipment and/or in part on the network component of the telecommunications network, causes the computer and/or the gateway entity and/or the user equipment and/or the network component of the telecommunications network to perform exemplary embodiments of the inventive method.

Furthermore, the present invention relates to a computer program product for improved handling of at least one communication exchange between a telecommunications network and at least one user equipment, the computer program product comprising a computer program stored on a storage medium, the computer program comprising program code which, when executed on a computer and/or on a gateway entity and/or on a user equipment and/or on a network component of a telecommunications network or in part on a gateway entity and/or in part on a user equipment and/or in part on the network component of the telecommunications network, causes the computer and/or the gateway entity and/or the user equipment and/or the network component of the telecommunications network to perform exemplary embodiments of the inventive method.

These and other characteristics, features and advantages of the present invention will become apparent from the following detailed description, taken in conjunction with the accompanying drawings, which illustrate, by way of example, the principles of the invention. The description is given for the sake of example only, without limiting the scope of the invention. The reference figures quoted below refer to the attached drawings.

The present invention will be described with respect to particular embodiments and with reference to certain drawings but the invention is not limited thereto but only by the claims. The drawings described are only schematic and are non-limiting. In the drawings, the size of some of the elements may be exaggerated and not drawn on scale for illustrative purposes.

Where an indefinite or definite article is used when referring to a singular noun, e.g. "a", "an", "the", this includes a plural of that noun unless something else is specifically stated.

Furthermore, the terms first, second, third and the like in the description and in the claims are used for distinguishing between similar elements and not necessarily for describing a sequential or chronological order. It is to be understood that the terms so used are interchangeable under appropriate circumstances and that the embodiments of the invention described herein are capable of operation in other sequences than described or illustrated herein.

In FIG. 1, a mobile communication network, especially a public land mobile network, is schematically shown as an example of an exemplary embodiment of an inventive telecommunications network 100. In the exemplary embodiment of FIG. 1, the telecommunications network 100 comprises an access network 110 and a core network 120. The core network 120 is only schematically shown via a cloud representation. The telecommunications network 100 is preferably a cellular telecommunications network comprising typically a plurality of network cells or radio cells, two of which are represented in FIG. 1 via a dashed line and reference signs 11 (first radio cell) and 12 (second radio cell). In the telecommunications network 100, typically a plurality of user equipments are camping on the telecommunications network 100 within radio cells 11, 12, i.e. the user equipments are connected or are camping on a first base station entity as—according to the exemplary embodiment shown in FIG. 1—first gateway entity 111, the first base station entity serving the first radio cell 11, or on a second base station entity as—according to the exemplary embodiment shown in FIG. 1—second gateway entity 112, the second base station entity serving the second radio cell 12. The first and second gateway entities 111, 112 are typically base station entities, typically base transceiver stations, e.g. an eNodeB in case of Long-Term Evolution (LTE). According to a further embodiment, the first gateway entity corresponds to a packet data gateway serving one or a plurality of base station entities, and the second gateway entity corresponds to a further packet data gateway serving one or a plurality of other base station entities.

Figure 2:
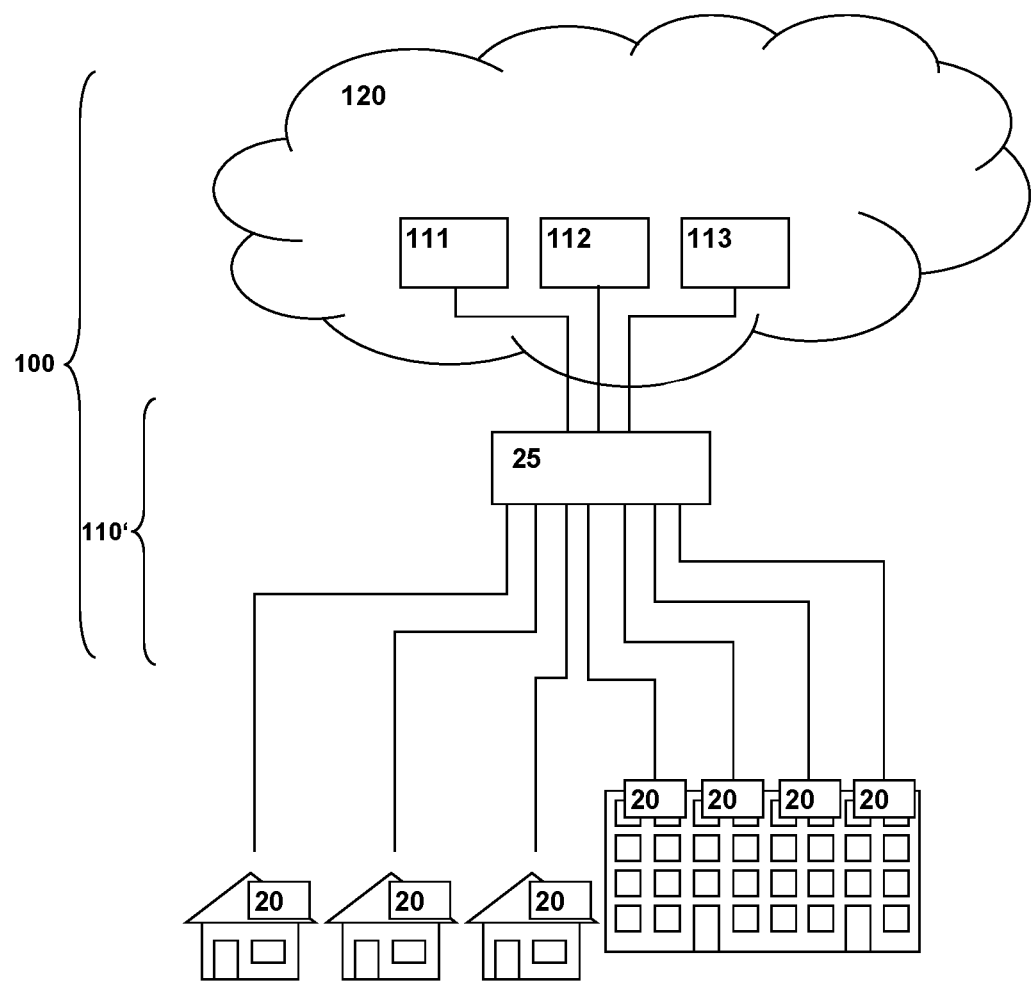
FIG. 2 schematically illustrates a fixed-line communication network as an example of an exemplary embodiment of an inventive telecommunications network with a multitude of customer premises equipments as examples of a user equipment of a fixed-line telecommunications network, a first gateway entity, a second gateway entity, and a third gateway entity, as well as a core network.

In FIG. 2, a fixed-line communication network as an example of an exemplary embodiment of an inventive telecommunications network 100 is schematically shown, comprising a multitude of customer premises equipments as examples of different user equipments 20 of a fixed-line telecommunications network, a first gateway entity 111, a second gateway entity 112, and a third gateway entity 113, as well as a core network 120. The user equipments 20 are connected to the core network 120 via an access network or aggregation network 110'. The aggregation network 110' comprises a network node 25.

Figure 3:
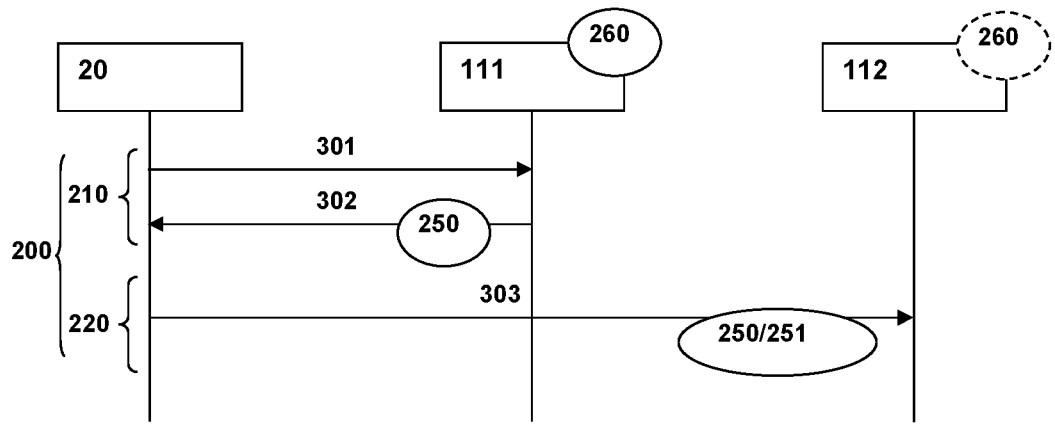
FIG. 3 schematically shows a communication diagram between the user equipment and the first and second gateway entities according to a first variant of the present invention.

FIG. 3 schematically shows a communication diagram between the user equipment and the first and second gateway entities according to a first variant of the present invention.

Figure 4:
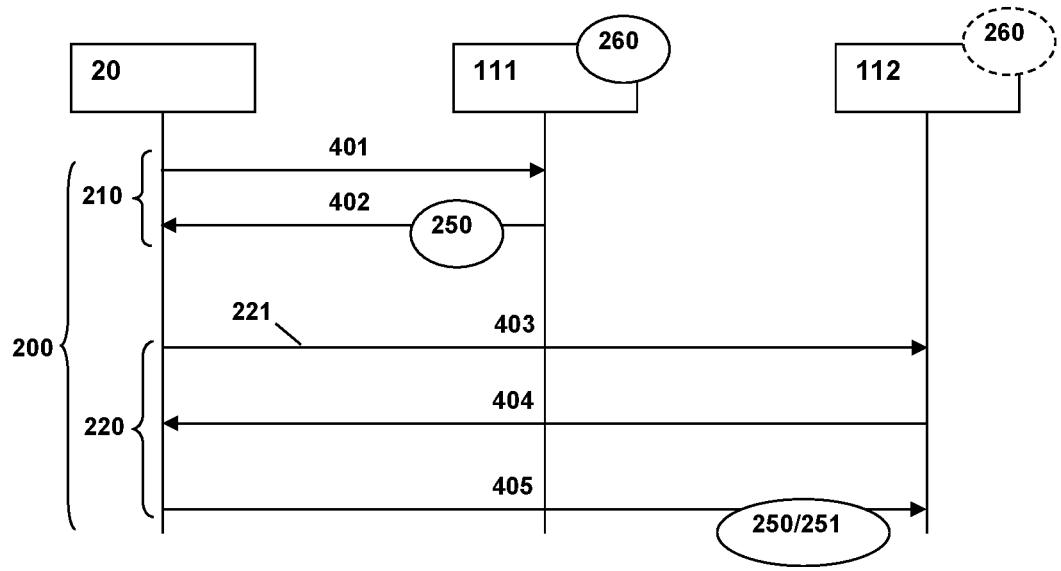
FIG. 4 schematically shows a communication diagram between the user equipment and the first and second gateway entities according to a second variant of the present invention.

FIG. 4 schematically shows a communication diagram between the user equipment and the first and second gateway entities according to a second variant of the present invention.

According to both variants of the present invention, in a first step (involving a first processing step 301 and a second processing step 302 according to the first variant represented in FIG. 3 and involving a first processing step 401 and a second processing step 402 according to the second variant represented in FIG. 4), the communication exchange between the user equipment 20 and the telecommunications network 100 is enabled by performing an attachment procedure of the user equipment 20 to the telecommunications network 100 involving the first gateway entity. During the attachment procedure, initial data packets 210 are transmitted between the user equipment 20 and the telecommunications network 100. Especially, in the first processing step 301/401, a first data packet is transmitted from the user equipment 20 to the first gateway entity 111, typically requesting attachment to the telecommunications network 100. In the second processing step 302/402, the token information 250—after having been generated by the telecommunications network 100 (especially by the first gateway entity 111)—is transmitted to the user equipment 20. The token information is indicative of the communication exchange of the user equipment 20 to be established with the telecommunications network 100.

In a second step (involving a third processing step 303 according to the first variant represented in FIG. 3 and involving a fifth processing step 405 according to the second variant represented in FIG. 4), subsequent to the first step, the user equipment 20 transmits at least one subsequent data packet 220, the at least one subsequent data packet 220 being received by the second gateway entity 112 instead of the first gateway entity 111. The at least one subsequent data packet 220 comprises the token information 250 or modified token information 251 such that the token information 250 is derivable from the modified token information 251 of the at least one subsequent data packet 220. The second gateway entity 112 generates a packet processing rule information 260 via which handling, enabling the continuation of the communication exchange between the user equipment 20 and the telecommunications network 100 (especially the second gateway entity 112), of the at least one subsequent data packet is provided. The packet processing rule information 260 is generated based on the token information 250 or modified token information 251 received from the user equipment 20. The token information 250 or the modified token information 251 comprises at least IP address information, used by the user equipment for the communication exchange, and identifier information of the user equipment and/or identifier information of the destination of the at least one subsequent data packet.

According to the first variant, represented in FIG. 3, preferably each (at least one) subsequent data packet 220 comprises the token information 250 or the modified token information 251. In contrast thereto, according to the second variant, represented in FIG. 4, there are data packets sent from the user equipment 20 to the second gateway entity 112 that do not comprise the token information 250 or the modified token information 251. Especially, during a third step, subsequent to the first step but prior to the second step, a further subsequent data packet 221 is received (involving a third processing step 403) by the second gateway entity 112. The further subsequent data packet 221 is lacking the token information 250 (and also the modified token information 251). This means that the second gateway entity 112 is not able to generate the packet processing rule information 260 (at least not based on the token information 250 or the further token information 251). That is why the gateway entity 112 requests (involving a fourth processing step 404)—during a fourth step, subsequent to the third step and prior to the second step—the transmission of the token information 250 or the modified token information 251 from the user equipment 20.

Hence, according to the present invention, in case of failure of the first gateway entity 111 (for whatever reason), the communication exchange of the user equipment 20 can be continued via the second gateway entity 112, just via sending the token information 250 or the modified token information 251 to the second gateway entity 112. The initial attachment (with the first gateway entity 111 according to the assumption made) might involve a first interaction using any cast; subsequently, the attachment procedure is conducted, especially comprising an authentication part or step; this latter part or step might comprise or require communication between the first gateway entity 111 and an AAA-functionality (Authentication, Authorization and Accounting) within the telecommunications network 100. Still during the first step (of attachment), the token information 250 is generated and transmitted to the user equipment 20. According to the first variant of the present invention, any subsequent data packet comprises the token information 250 or the modified token information 251. In case the second gateway entity 112 receives such a data packet, it is able to generate the packet processing rule 260 (or flow entry) and handle the communication exchange with the user equipment 20. According to the second variant of the present invention, not all subsequent data packets 220 comprise the token information 250 or the modified token information 251, and therefore, the transmission of the token information 250 or the modified token information 251 is requested by the second gateway entity 112. In case of a mobile communication network and the need for a handover arises, the same principle applies. Especially, the token information 250 comprises a hash of the IP address used and a hash of the user ID used.

A user equipment 20 attaches to the network, its authentication traffic gets directed by a load balancer entity inside a data center hosting the gateway (or gateway entity) to an instance of a gateway platform. That can be a dedicated gateway for authentication or the same type of gateway that later forwards the user traffic. After successful authentication (initial attachment), the user equipment 20 has received one or more IP addresses. Further, the user equipment receives a token (or token information) that is generated by the backend systems (i.e. by the telecommunications network 100) and is valid for the lifetime of the session. This token (or token information 250) allows the user equipment to use the IP addresses it had been assigned. The token may be structured in a way that load sharing is facilitated, e.g. it may include routing-relevant information.

The token information can also include a signed part which makes it easy for any device in the telecommunications network 100 receiving it to immediately judge if this token (or token information 250) is an allowed one (security check). This check may include checking that the source IP address is a valid one.

Additionally, the token information 250 can also be descriptive so that a receiving node (such as the second gateway entity 112) can immediately apply the policies needed to treat the data packets.

According to the first variant, all packets the user equipment 20 generates will include the token (or token information 250 or modified token information 251) (e.g. as option in IPv6 headers or as part of a network service header (NSH)). A load balancer entity may balance based on the token information 250 or modified token information 251 or a hash value of it. Furthermore, the load balancer entity can still also use IP source address as a parameter for conducting load balancing. The gateway entity 111, 112 is able to check the token information 250 or modified token information 251 by doing a local lookup and/or generating a packet processing rule 260 (or flow entry, saved, e.g., in a cache memory or in a TCAM (Ternary Content Addressable Memory) memory that can be immediately looked up and actions be applied.

According to the second variant, data packets do not necessarily include the token (and not all of them). Once a gateway entity receives such a data packet, it either has a flow entry (i.e. a packet processing rule information 260) and just forwards it and regularly asks the user equipment for the token information. This process can be used as a keepalive mechanism.

In case a packet is received from an IP address that is not yet known (or from an IP address at a physical or virtual port where it did not appear yet), the token information is being asked for. In case the token is valid, the respective gateway entity installs a forwarding/packet processing rule (packet processing rule information 260). This is an easy method to be executed in case a gateway needs to take over from a gateway that just went down. State will immediately be created. According to alternative solutions, the gateway entity could check with a backend system if the token is valid/which policies need to be applied or—in case that pre-configuration allows this—the gateway entity could do these tasks locally.

In both cases, upstream packets towards the internet will create a flow entry in the load balancer, either based on source IP address or token information in case it will not be taken off by the gateway (implementation-specific).

Using the principle described above, IP mobility can be easily implemented. In case a user equipment moves and due to that movement its packets after the local handover on the access side will reach a different gateway at the same location using the same IP router upstream, the methods described above apply. A gateway receiving an unknown source address will check the token as described and then forward the packet, creating a flow entry update in the upstream load balancer.

In case a different data center or data center domain is used, the IP router on the upstream direction needs to create a host route for the IP address and immediately inject it into the IP network's interior routing protocol (IGP). This is possible using fast convergence and taking into account the tremendous increase on routing table entries in IP routers over the last years.

According to the present invention, it is advantageously possible that accounting will still work, as session identifiers such as IP address and/or token are unique and can be used The security policy may be that any packet that includes the token is accepted. Or, the token plus the IP address together build a value (e.g. via a function) that yields a result that is acceptable.

Against spoofing attacks, the following two scenarios apply:
1) The IP address is used by somebody else: In this case, protection at the network entry point can be used. If an IP address appears at a virtual port where it had not been used before, the system shall ask for re-authentication or at least the token.
2) IP address and token are used by somebody else: For this case, it is required to hijack a session by e.g. wiretapping the traffic and getting to know token and IP address. However, two different possibilities apply: One is to more often ask for a re-negotiation of the token information 250; furthermore, it is proposed to use a method that calculates a new token based on the old one plus a shared secret information. Another, more tedious possibility consists in authenticating in short intervals.

If a token changes, the load balancer entity (or entities) might re-direct data packets to a different gateway instance than before. This is not an issue as the state in the new gateway entity can be created using the token information or the modified token information (same procedure as with mobility).

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

The invention claimed is:

1. A method for handling of at least one communication exchange between a telecommunications network and at least one user equipment, the at least one communication exchange being based on transmission and reception of data packets between the telecommunications network and the at least one user equipment, wherein the telecommunications network comprises a plurality of gateway entities, the plurality of gateway entities comprising at least a first gateway entity and a second gateway entity, wherein the method comprises:

in a first step, the at least one communication exchange is enabled by performing an attachment procedure of the at least one user equipment to the telecommunications network involving the first gateway entity, wherein during the attachment procedure, initial data packets are transmitted and a communication session is established, wherein token information is generated by the telecommunications network, wherein the token information is valid for a lifetime of the communication session, and wherein the token information is transmitted from the telecommunications network to the at least one user equipment, the token information being indicative of the at least one communication exchange to be established; and in a second step, subsequent to the first step, the at least one user equipment transmits at least one subsequent data packet to the second gateway entity and not the first gateway entity, wherein the at least one subsequent data packet comprises the token information or the at least one subsequent data packet comprises information for deriving the token information, wherein the second gateway entity generates packet processing rule information based on the token information or the information for deriving the token information, wherein:

the at least one user equipment includes the token information or the information for deriving the token information in all further subsequent data packets sent by the at least one user equipment during the lifetime of the communication session after the at least one subsequent data packet for routing of the plurality of further subsequent data packets by any gateway entity of the plurality of gateway entities; or the second gateway entity stores a flow entry for forwarding data packets in a memory, wherein the flow entry is based on the packet processing rule information, wherein the at least one user equipment does not include the token information or the information for deriving the token information in at least one further subsequent data packet sent by the at least one user equipment after the at least one subsequent data packet, wherein the at least one further subsequent data packet sent by the at least one user equipment after the at least one subsequent data packet is routed based on retrieving the flow entry from the memory and forwarding the at least one further subsequent data packet according to the flow entry;

wherein the second gateway entity triggers an upstream routing update to facilitate a return path to the at least one user equipment being transmitted to an upstream load balancer entity, wherein the return path to the at least one user equipment is via the second gateway entity and not the first gateway entity;

wherein the token information and/or the information for deriving the token information comprises at least one out of the following:

an indication related to one or a plurality of quality-of-service related parameters associated with the at least one communication exchange;

signed part information allowing for a security check to be performed based on the token information or the information for deriving the token information;

an indication related to one or a plurality of policies to apply by a receiving node of the telecommunications network;

an indication related to one or a plurality of user equipment capability related parameters associated with the at least one user equipment and to be applied during the at least one communication exchange;

an indication related to one or a plurality of accounting related parameters associated with the at least one communication exchange;

an indication related to one or a plurality of network access rights related parameters associated with the at least one communication exchange; or an indication related to one or a plurality of content access rights related parameters associated with the at least one communication exchange.

2. The method according to claim 1, wherein during a third step, subsequent to the first step but prior to the second step, a further subsequent data packet is received by the second gateway entity, the further subsequent data packet lacking the token information, wherein—during a fourth step, subsequent to the third step and prior to the second step—the second gateway entity requests, from the at least one user equipment, transmission of the token information or the information for deriving the token information.

3. The method according to claim 1, wherein the token information and/or the information for deriving the token information further comprises at least one out of the following:

IP address information corresponding to the IP address used by the at least one user equipment or signaled by the at least one subsequent data packet;

hash value information of IP address information corresponding to the IP address used by the user equipment or signaled by the at least one subsequent data packet;

device identification information of the at least one user equipment or identification information of the user of the at least one user equipment;

hash value information of device identification information of the at least one user equipment or of identification information of the user of the at least one user equipment; or an indication related to routing information or related to routing-relevant information.

4. The method according to claim 1, wherein a lifetime indication is associated with the token information or with the information for deriving the token information.

5. The method according to claim 1, wherein the token information or the information for deriving the token information is transmitted, by the at least one user equipment, as part of an option in an IPv6 header of IPv6 data packets and/or as part of a network service header (NSH) and/or as part of a Virtual Local Area Network header (VLAN-header) and/or as part of a Media Access Control address (MAC-address), wherein the transmission of the token information or the information for deriving the token information is provided within each data packet or periodically or upon request from the respective gateway entity.

6. The method according to claim 1, wherein the token information or the information for deriving the token information is self-contained token information such that the packet processing rule information is generated, by the second gateway entity, solely based on the token information or the information for deriving the token information, respectively; or wherein the token information or the information for deriving the token information is abstract token information such that the packet processing rule information is generated, by the second gateway entity, based on the token information or the information for deriving the token information, respectively, but using a queries handling network entity of the telecommunications network.

7. The method according to claim 1, wherein the second gateway entity is unaware of the at least one communication exchange.

8. The method according to claim 1, wherein the method further comprises:

determining whether the first gateway entity or the second gateway entity receives the at least one subsequent data packet based on:

availability of the first gateway entity and/or the second gateway entity; and/or a load balancing decision of a load balancing entity within the telecommunications network; and/or availability of the first and/or second gateway entities for the at least one user equipment related to a different mobility situation of the at least one user equipment.

9. A system for handling of at least one communication exchange between the telecommunications network and at least one user equipment, the at least one communication exchange being based on transmission and reception of data packets between the telecommunications network and the at least one user equipment, wherein the system comprises:

the at least one user equipment; and the telecommunications network, wherein the telecommunications network comprises a plurality of gateway entities, the plurality of gateway entities comprising at least a first gateway entity and a second gateway entity;

wherein the at least one user equipment is configured to perform an attachment procedure to the telecommunications network involving the first gateway entity to enable the at least one communication exchange, wherein during the attachment procedure, initial data packets are transmitted and a communication session is established;

wherein the telecommunication network is configured to generate token information and to transmit the token information to the at least one user equipment, wherein the token information is valid for a lifetime of the communication session, and wherein the token information is indicative of the at least one communication exchange to be established; and wherein the at least one user equipment is configured to transmit at least one subsequent data packet to the second gateway entity and not the first gateway entity, wherein the at least one subsequent data packet comprises the token information or the at least one subsequent data packet comprises information for deriving the token information, wherein the second gateway entity is configured to generate packet processing rule information based on the token information or the information for deriving the token information, wherein:

the at least one user equipment is configured to include the token information or the information for deriving the token information in all further subsequent data packets sent by the at least one user equipment during the lifetime of the communication session after the at least one subsequent data packet for routing of the plurality of further subsequent data packets by any gateway entity of the plurality of gateway entities; or the second gateway entity is configured to store a flow entry for forwarding data packets in a memory, wherein the flow entry is based on the packet processing information, wherein the at least one user equipment is configured to not include the token information or the information for deriving the token information in at least one further subsequent data packet sent by the at least one user equipment after the at least one subsequent data packet, wherein the at least one further subsequent data packet sent by the at least one user equipment after the at least one subsequent data packet is routed based on retrieving the flow entry from the memory and forwarding the at least one further subsequent data packet according to the flow entry;

wherein the second gateway entity is configured to trigger an upstream routing update to facilitate a return path to the at least one user equipment being transmitted to an upstream load balancer entity, wherein the return path to the at least one user equipment is via the second gateway entity and not the first gateway entity;

wherein the token information and/or the information for deriving the token information comprises at least one out of the following:

an indication related to one or a plurality of quality-of-service related parameters associated with the at least one communication exchange;

signed part information allowing for a security check to be performed based on the token information or the information for deriving the token information;

an indication related to one or a plurality of policies to apply by a receiving node of the telecommunications network;

an indication related to one or a plurality of user equipment capability related parameters associated with the at least one user equipment and to be applied during the at least one communication exchange;
an indication related to one or a plurality of accounting related parameters associated with the at least one communication exchange;
an indication related to one or a plurality of network access rights related parameters associated with the at least one communication exchange; or
an indication related to one or a plurality of content access rights related parameters associated with the at least one communication exchange.

10. The system according to claim 9, wherein the second gateway entity is configured to receive a further subsequent data packet prior to the at least one subsequent data packet, wherein the further subsequent data packet lacks the token information, wherein the second gateway entity is configured to request, between the further subsequent data packet and the at least one subsequent data packet, transmission of the token information or the information for deriving the token information from the at least one user equipment.

11. The system according to claim 9, wherein the telecommunications network is a fixed line communication network; and
wherein the telecommunications network comprises an access network and a core network, and wherein the access network comprises the plurality of gateway entities, wherein:
the plurality of gateway entities are remote access server entities of an aggregation network as part of the access network or the core network;
the plurality of gateway entities are nodes located either in the access network, the aggregation network or the core network; and/or
the plurality of gateway entities are instances residing in a data center where load sharing between these instances is applied based on the token information or information directly related to the at least one communication exchange.

12. The system according to claim 9, wherein the telecommunications network is a mobile communication network; and
wherein the telecommunications network comprises an access network and a core network, and wherein the access network comprises the plurality of gateway entities, wherein:
the plurality of gateway entities are base station entities of the mobile communication network;
the plurality of gateway entities are remote access server entities of an aggregation network as part of the access network or the core network;
the plurality of gateway entities are nodes located either in the access network, the aggregation network or the core network; and/or
the plurality of gateway entities are instances residing in a data center where load sharing between these instances is applied based on the token information or information directly related to the at least one communication exchange.

13. One or more non-transitory, computer-readable mediums having processor-executable instructions stored thereon for handling of at least one communication exchange between a telecommunications network and at least one user equipment, the at least one communication exchange being based on transmission and reception of data packets between the telecommunications network and the at least one user equipment, wherein the telecommunications network comprises a plurality of gateway entities, the plurality of gateway entities comprising at least a first gateway entity and a second gateway entity, wherein the processor-executable instructions, when executed, facilitate the following:
in a first step, the at least one communication exchange is enabled by performing an attachment procedure of the at least one user equipment to the telecommunications network involving the first gateway entity, wherein during the attachment procedure, initial data packets are transmitted and a communication session is established, wherein token information is generated by the telecommunications network, wherein the token information is valid for a lifetime of the communication session, and wherein the token information is transmitted from the telecommunications network to the at least one user equipment, the token information being indicative of the at least one communication exchange to be established;
in a second step, subsequent to the first step, the at least one user equipment transmits at least one subsequent data packet to the second gateway entity and not the first gateway entity, wherein the at least one subsequent data packet comprises the token information or the at least one subsequent data packet comprises information for deriving the token information, wherein the second gateway entity generates packet processing rule information based on the token information or the information for deriving the token information, and wherein:
the at least one user equipment includes the token information or the information for deriving the token information in all further subsequent data packets sent by the at least one user equipment during the lifetime of the communication session after the at least one subsequent data packet for routing of the plurality of further subsequent data packets by any gateway entity of the plurality of gateway entities; or
the second gateway entity stores a flow entry for forwarding data packets in a memory, wherein the flow entry is based on the packet processing rule information, wherein the at least one user equipment does not include the token information or the information for deriving the token information in at least one further subsequent data packet sent by the at least one user equipment after the at least one subsequent data packet, wherein the at least one further subsequent data packet sent by the at least one user equipment after the at least one subsequent data packet is routed based on retrieving the flow entry from the memory and forwarding the at least one further subsequent data packet according to the flow entry; and
the second gateway entity triggers an upstream routing update to facilitate a return path to the at least one user equipment being transmitted to an upstream load balancer entity, wherein the return path to the at least one user equipment is via the second gateway entity and not the first gateway entity;
wherein the token information and/or the information for deriving the token information comprises at least one out of the following:
an indication related to one or a plurality of quality-of-service related parameters associated with the at least one communication exchange;
signed part information allowing for a security check to be performed based on the token information or the information for deriving the token information;

an indication related to one or a plurality of policies to apply by a receiving node of the telecommunications network;
an indication related to one or a plurality of user equipment capability related parameters associated with the at least one user equipment and to be applied during the at least one communication exchange;
an indication related to one or a plurality of accounting related parameters associated with the at least one communication exchange;
an indication related to one or a plurality of network access rights related parameters associated with the at least one communication exchange; or
an indication related to one or a plurality of content access rights related parameters associated with the at least one communication exchange.

* * * * *